(12) United States Patent
Moore

(10) Patent No.: US 7,191,115 B2
(45) Date of Patent: Mar. 13, 2007

(54) STATISTICAL METHOD AND APPARATUS FOR LEARNING TRANSLATION RELATIONSHIPS AMONG WORDS

(75) Inventor: Robert C. Moore, Mercer Island, WA (US)

(73) Assignee: Microsoft Corporation, Redmond, WA (US)

( * ) Notice: Subject to any disclaimer, the term of this patent is extended or adjusted under 35 U.S.C. 154(b) by 765 days.

(21) Appl. No.: 10/173,252

(22) Filed: Jun. 17, 2002

(65) Prior Publication Data

US 2002/0198701 A1 Dec. 26, 2002

Related U.S. Application Data

(60) Provisional application No. 60/299,510, filed on Jun. 20, 2001.

(51) Int. Cl.
*G06F 17/28* (2006.01)

(52) U.S. Cl. .............................................. 704/2; 704/9
(58) Field of Classification Search ............... 704/2, 704/9
See application file for complete search history.

(56) References Cited

U.S. PATENT DOCUMENTS

| | | | | |
|---|---|---|---|---|
| 5,477,451 A | * | 12/1995 | Brown et al. | 704/9 |
| 5,510,981 A | * | 4/1996 | Berger et al. | 704/2 |
| 5,907,821 A | * | 5/1999 | Kaji et al. | 704/4 |
| 6,236,958 B1 | | 5/2001 | Lange et al. | 704/8 |
| 6,885,985 B2 | * | 4/2005 | Hull | 704/2 |
| 2002/0198701 A1 | | 12/2002 | Moore | 704/2 |
| 2003/0023422 A1 | * | 1/2003 | Menezes et al. | 704/2 |
| 2003/0061023 A1 | * | 3/2003 | Menezes et al. | 704/4 |
| 2004/0098247 A1 | | 5/2004 | Moore | 704/4 |
| 2004/0172235 A1 | | 9/2004 | Pinkham | 704/2 |

OTHER PUBLICATIONS

I. Dan Melamed,, "Automatic Construction of Clean Broad-Coverage Translation Lexicons," 2nd Conferences of the Association for Machine Translation in the Americas (ATMA '96), 10 pages (1996).
I. Dan Melamed, "Automatic Discovery of Non-Compositional Compounds in Parallel Data," 2nd Conference on Empirical Methods in Natural Language Processing (EMNLP '97), 12 pages (1997).

(Continued)

*Primary Examiner*—Richemond Dorvil
*Assistant Examiner*—Leonard Saint-Cyr
(74) *Attorney, Agent, or Firm*—Westman, Champlin & Kelly

(57) ABSTRACT

A parallel bilingual training corpus is parsed into its content words. Word association scores for each pair of content words consisting of a word of language L1 that occurs in a sentence aligned in the bilingual corpus to a sentence of language L2 in which the other word occurs. A pair of words is considered "linked" in a pair of aligned sentences if one of the words is the most highly associated, of all the words in its sentence, with the other word. The occurrence of compounds is hypothesized in the training data by identifying maximal, connected sets of linked words in each pair of aligned sentences in the processed and scored training data. Whenever one of these maximal, connected sets contains more than one word in either or both of the languages, the subset of the words in that language is hypothesized as a compound.

7 Claims, 8 Drawing Sheets

OTHER PUBLICATIONS

K. Yamamoto et al., "A Comparative Study on Translation Units for Bilingual Lexicon Extraction," In Proceedings of the Workshop on Data-Driven Machine Translation, 39th Annual Meeting of the Association for Computational Linguistics, pp. 87-94 (2001).

F. Smadja et al., "Translating Collocations for Bilingual Lexicons: A Statistical Approach," Computational Linguistics, 22(1): 1-38 (1996).

J. Kupiec, "An Algorithm for Finding Noun Phrase Correspondences in Bilingual Corpora," In Proceedings of the 31st Annual Meeting of the Association for Computational Linguistics, pp. 17-22 (1993).

Y. Al-Onaizan and K. Knight. 2002. Named entity translation: extended abstract. In advance papers of Human Language Technology 2002, San Diego, CA. pp. 111-115.

N. Chinchor. 1997. MUC-7 named entity task definition. In Proceedings of the 7th Message Understanding Conference.

I. Dagan and K. Church. 1997. Termight: coordinating humans and machines in bilingual terminology acquisition. Machine Translation, 12:89-107.

T. Dunning. 1993. Accurate methods for the statistics of surprise and coincidence. Computational Linguistics, 19(1):61-74.

J. Kupiec. 1993. An algorithm for finding noun phrase correspondences in bilingual corpora. In Proceedings of the 31st Annual Meeting of the Association for Computational Linguistics. Columbus Ohio, pp. 17-22.

I.D. Melamed. 2000. Models of Translational Equivalence. Computational Linguistics, 26(2): 221-249.

R. C. Moore. 2001. Towards a simple and accurate statistical approach to learning translation relationships among words. In Proceedings of the Workshop on Data-Driven Machine Translation, 39th Annual Meeting of the Association for Computational Linguistics, Toulouse, France, pp. 79-86.

S. Richardson, W.B. Dolan, M. Corston-Oliver and A. Menezes. 2001. Overcoming the customization bottleneck using example-based MT. In Proceedings of the Workshop on Data-Driven Machine Translation, 39th Annual Meeting of the Association for Computational Linguistics, Toulouse, France, pp. 9-16.

D. Wu. 1995. Grammarless extraction of phrasal translation examples from parallel texts. In Proceedings of TMI-95, Sixth International Conference on Theoretical and Methodological Issues in Machine Translation, Leuven, Belgium, vol. 2, pp. 354-372.

I. D. Melamed. 1995. Automatic evaluation and uniform filter cascades for inducing N-Best translation lexicons. In proceedings of the Third Workshop on Very Large Corpora, pp. 184-198, Cambridge, MA.

A. Kumano and H. Hirakawa. 1994. Building an MT dictionary from parallel texts based on linguistic and statistical information. In Proceedings of the 15th International Conference on Computational Linguistics, pp. 76-81, Kyoto, Japan.

W. Gale and K. Church. 1991. Identifying word correspondences in parallel texts. In Proceedings Speech and Natural Language Workshop. pp. 152-157, Asilomar, CA. DARPA.

P. Fung. 1995. A pattern matching method for finding noun and proper noun translations from noisy parallel corpora. In Proceedings of the 33rd Annual Meeting, pp. 236-243, Boston MA. Association for Computational Linguistics.

D. Wu and X. Xia. 1994. Learning an English-Chinese lexicon from a parallel corpus. In Proceedings of the 1st Conference of the Association for Machine Translation in the Americas, pp. 206-213, Columbia, MD.

Lars Ahrenberg et al., "A Simply Hybrid Aligner for Generating Lexical Correspondence in Parallel Texts," Proceedings of COLING '98/ACL '98.

* cited by examiner

E1    E2__E3   E4
F1    F2__F3   F4

STATISTICAL METHOD AND APPARATUS FOR LEARNING TRANSLATION RELATIONSHIPS AMONG WORDS

The present application is based on and claims the benefit of U.S. provisional patent application Ser. No. 60/299,510, filed Jun. 20, 2001, the content of which is hereby incorporated by reference in its entirety.

BACKGROUND OF THE INVENTION

The present invention relates to learning relationships among words. More specifically, the present invention relates to a statistical approach for learning translation relationships among words in different languages.

Machine translation systems are systems that receive a textual input in one language, translate it to a second language, and provide a textual output in the second language. In doing this, such systems typically use a translation lexicon to obtain correspondences, or translation relationships, between content words which are obtained during training.

A common approach to deriving translation lexicons from empirical data involves choosing a measure of a degree of association between words in a first language, L1, and words in a second language, L2, in aligned sentences of a parallel bilingual corpus. Word pairs (consisting of a word from L1 and a word from L2) are then ordered by rank according to the measure of association chosen. A threshold is chosen and the translation lexicon is formed of all pairs of words whose degree of association is above the threshold.

For example, in one prior art approach, the similarity metric (the measure of degree of association between words) is based on how often words co-occur in corresponding regions (e.g., sentences) of an aligned parallel text corpus. The association scores for the different pairs of words are computed and those word pairs are sorted in descending order of their association score. Again, a threshold is chosen and the word pairs whose association score exceeds the threshold become entries in the translation lexicon.

This type of method, however, has disadvantages. One problem is that the association scores are typically computed independently of one another. For example, assume the words in language L1 are represented by the symbol $V_k$, where k is an integer representing different words in L1; and words in language L2 are represented by $W_k$, where k is an integer representing different words in L2. Thus, sequences of the V's and W's represent two aligned text segments. If $W_k$ and $V_k$ occur in similar bilingual contexts (e.g., in the aligned sentences), then any reasonable similarity metric will produce a high association score between them, reflecting the interdependence of their distributions.

However, assume that $V_k$ and $V_{k+1}$ also appear in similar contexts (e.g., in the same sentence). That being the case, there is also a strong interdependence between the distributions of $V_k$ and $V_{k+1}$. Thus, the problem results that if $W_k$ and $V_k$ appear in similar contexts, and $V_k$ and $V_{k+1}$ appear in similar contexts, then $W_k$ and $V_{k+1}$ will also appear in similar contexts. This is known as an indirect association because it arises only by virtue of the associations between $W_k$ and $V_k$ and between $V_{k+1}$ and $V_k$. Prior methods that compute association scores independently of each other cannot distinguish between a direct association (e.g., that between $W_k$ and $V_k$) and an indirect association (e.g., that between $W_k$ and $V_{k+1}$). Not surprisingly, this produces translation lexicons replete with indirect associations, which are likely incorrect as well.

As a concrete example of an indirect association, consider a parallel French-English corpus, consisting primarily of translated computer software manuals. In this corpus, the English terms "file system" and "system files" occur very often. Similarly, the corresponding French terms "systēme de fichiers", and "fichiers systēme" also appear together very often. Because these monolingual co-locations are common, the spurious translation pairs fichier/system and systēme/file also receive rather high association scores. These scores may be higher, in fact, than the scores for many true translation pairs.

This deficiency has been addressed by some prior techniques. For example, Melamed, *Automatic Construction of Clean Broad-Coverage Translation Lexicons*, Second Conference of the Association for Machine Translation in the America's (AMTA 1996), Montreal Canada, is directed to this problem.

Melamed addresses this problem by disregarding highly associated word pairs as translations if they are derived from aligned sentences in which there are even more highly associated pairs involving one or both of the same words. In other words, it is assumed that stronger associations are also more reliable and thus direct associations are stronger than indirect associations. Therefore, if a segment (or sentence) containing V is aligned with a segment (or sentence) containing both W and W' the entries (V,W) and (V,W') should not both appear in the translation lexicon. If they do, then at least one is likely incorrect. Since we assume there is a tendency for direct associations to be stronger than indirect associations, then the entry with the highest association score is the one chosen as the correct association.

In the example discussed above, in parallel English and French sentences containing "fichier" and "systēme" on the French side and "file" and "system" on the English side, the associations of fichier/system and systēme/file will be discounted, because the degree of association for "fichier/file" and "systēme/system" will likely be much higher in the same aligned sentences.

While this approach is reported to extend high accuracy output to much higher coverage levels than previously reported, it does have disadvantages. For example, it is quite complex and cumbersome to implement, and it is believed to be quite time consuming to run.

Another difficulty encountered in learning translation relationships among words involves compounds (or multi-word sequences which are taken together to form compounds). Such compounds may translate to a single word in the other language, or to multiple words in the other language. Prior techniques assumed that lexical translation relationships involved only single words. Of course, as shown from the following list of compounds, this is manifestly untrue:

Base_de_donnees/database
Mot_de_passe/password
Sauvegarder/back_up
Annuler/roll_back
Ouvrir_session/log_on In the first four pairs listed above, a compound in one language is translated as a single word in another language. However, in the last example, a compound in one language is translated as a compound in the other language, and each of the individual components of the compound cannot be translated in any meaningful way into one of the individual components in the other compound. For example, "ouvrir" which is typically translated as "open", cannot be reasonably translated as either "log" or "on". Similarly, "session" which is typically translated as "session" also cannot be reasonably translated as either "log" or on One prior attempt to address this problem is also discussed by Melamed, *Automatic Discovery of Non-Compositional Compounds in Parallel Data,* Conference on Empirical Methods in Natural Language Processing (EMNLP 97) Providence, R.I. (1997). Melamed induces two translation models, a trial translation model that involves a candidate compound and a base translation model that does not. If the value of Melamed's objective function is higher in the trial model than in the base model, then the compound is deemed valid. Otherwise, the candidate compound is deemed invalid. However, the method Melamed uses to select potential compounds is quite complex and computationally expensive, as is his method of verification by construction of a trial translation model.

SUMMARY OF THE INVENTION

A parallel bilingual training corpus is parsed into its content words. Word association scores for each pair of content words consisting of a word of language L1 that occurs in a sentence aligned in the bilingual corpus to a sentence of language L2 in which the other word occurs. A pair of words is considered "linked" in a pair of aligned sentences if one of the words is the most highly associated, of all the words in its sentence, with the other word. The occurrence of compounds is hypothesized in the training data by identifying maximal, connected sets of linked words in each pair of aligned sentences in the processed and scored training data. Whenever one of these maximal, connected sets contains more than one word in either or both of the languages, the subset of the words in that language is hypothesized as a compound. The original input text is rewritten, replacing the hypothesized compounds by single, fused tokens. The association scores are then recomputed for the compounds (which have been replaced by fused tokens) and any remaining individual words in the input text. The association scores are again recomputed, except that this time, co-occurrences are taken into account in computing the association scores only where there is no equally strong or stronger other association in a particular pair of aligned sentences in the training corpus.

Translation pairs can be identified as those word pairs or token pairs that have association scores above a threshold, after the final computation of association scores.

Of course, the present invention can also be embodied simply as a method or system for hypothesizing occurrences of compounds in training data that comprises an aligned bilingual corpus.

Similarly, the present invention includes a method of identifying translations of "captoids", by which we mean titles, or other special phrases, all of whose words are capitalized. (Finding translations of captoids presents a special problem in languages like French or Spanish, in which convention dictates that only the first word of such an item is capitalized, so that the extent of the captoid translation is difficult to determine.) In that embodiment, compounds are first identified in a source language (such as English) . This can be done by finding strings of text where the first word begins with a capital letter, and later tokens in the contiguous string do not begin with a lowercase letter. Next, compounds are hypothesized in the target text by finding words that start with a capital letter and flagging this as the possible start of a corresponding compound. The target text is then scanned from left to right flagging subsequent words that are most strongly related to words in the identified compound in the source text, while allowing up to a predetermined number (e.g., 2) contiguous non-most highly related words, so long as they are followed by a most highly related word.

The left to right scan can be continued until more than the predetermined number (e.g., more than 2) contiguous words are found that are not most highly related to words in the identified compound in the source text, or until no more most highly related words are present in the target text, or until punctuation is reached.

DETAILED DESCRIPTION OF ILLUSTRATIVE EMBODIMENTS

The discussion of FIG. 1 below is simply to set out but one illustrative environment in which the present invention can be used, although it can be used in other environments as well.

Figure 1:
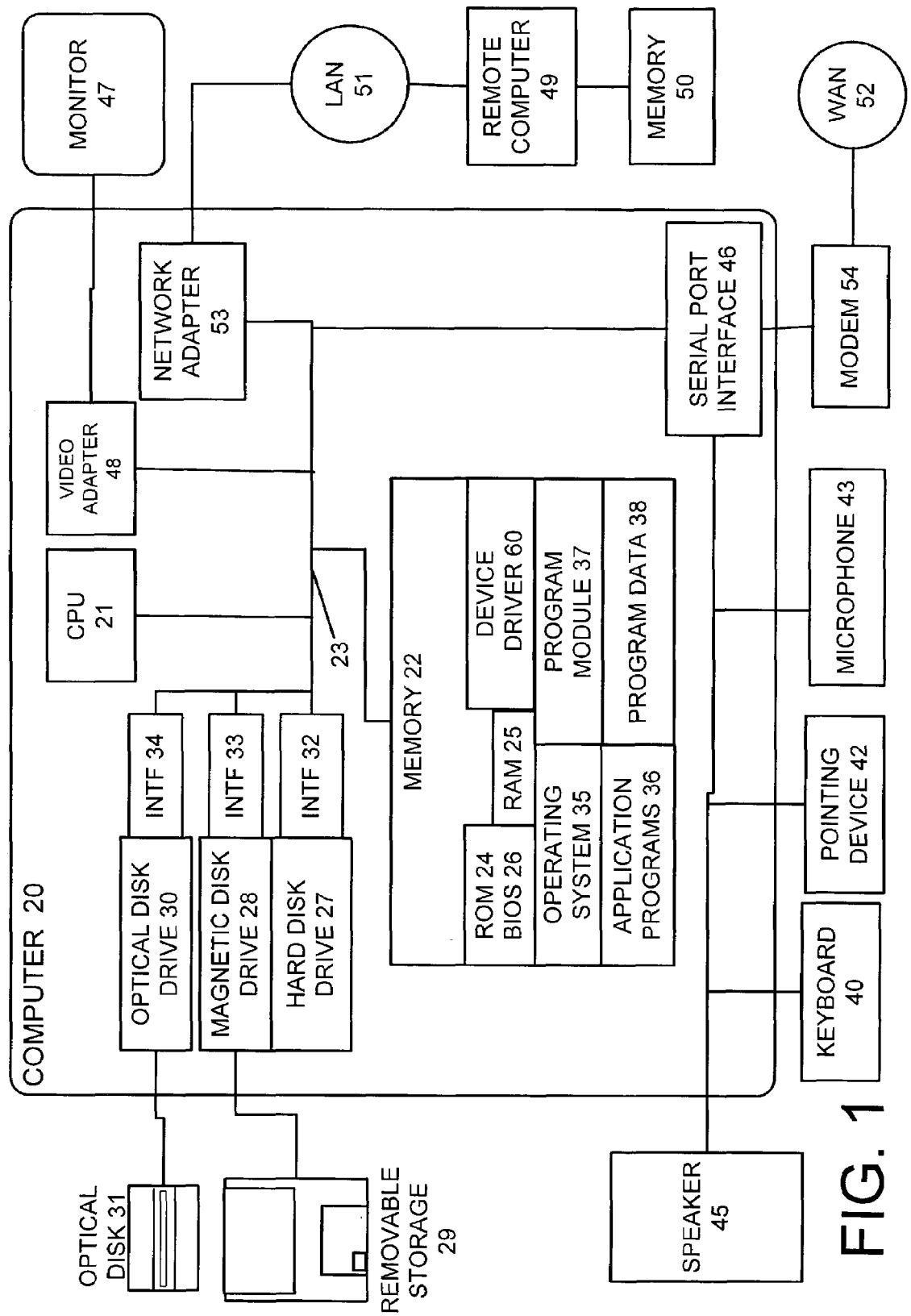
FIG. 1 is a block diagram of a general context in which the present invention can be used.

FIG. 1 is a block diagram of a computer 20 in accordance with one illustrative embodiment of the present invention. FIG. 1 and the related discussion are intended to provide a brief, general description of a suitable computing environment in which the invention may be implemented. Although not required, the invention will be described, at least in part, in the general context of computer-executable instructions, such as program modules, being executed by a personal computer. Generally, program modules include routine programs, objects, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

In FIG. 1, an exemplary system for implementing the invention includes a general purpose computing device in the form of a conventional personal computer 20, including processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 a random access memory (RAM) 25. A basic input/output 26 (BIOS), containing the basic routine that helps to transfer information between elements within the personal computer 20, such as during start-up, is stored in ROM 24. The personal computer 20 further includes a hard disk drive 27 for reading from and writing to a hard disk (not shown), a magnetic disk drive 28 for reading from or writing to removable magnetic disk 29, and an optical disk drive 30 for reading from or writing to a removable optical disk 31 such as a CD ROM or other optical media. The hard disk drive 27, magnetic disk drive 28, and optical disk drive 30 are connected to the system bus 23 by a hard disk drive interface 32, magnetic disk drive interface 33, and an optical drive interface 34, respectively. The drives and the associated computer-readable media provide nonvolatile storage of computer readable instructions, data structures, program modules and other data for the personal computer 20.

Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memory (ROM), and the like, may also be used in the exemplary operating environment.

A number of program modules may be stored on the hard disk, magnetic disk 29, optical disk 31, ROM 24 or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 45 that is coupled to the system bus 23, but may be connected by other interfaces, such as a sound card, a parallel port, a game port or a universal serial bus (USB). A monitor 47 or other type of display device is also connected to the system bus 23 via an interface, such as a video adapter 48. In addition to the monitor 47, personal computers may typically include other peripheral output devices such as a speaker and printers (not shown).

The personal computer 20 may operate in a networked environment using logic connections to one or more remote computers, such as a remote computer 49. The remote computer 49 may be another personal computer, a server, a router, a network PC, a peer device or other network node, and typically includes many or all of the elements described above relative to the personal computer 20, although only a memory storage device 50 has been illustrated in FIG. 1. The logic connections depicted in FIG. 1 include a local are network (LAN) 51 and a wide area network (WAN) 52. Such networking environments are commonplace in offices, enterprise-wide computer network intranets and the Internet.

When used in a LAN networking environment, the personal computer 20 is connected to the local area network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a network environment, program modules depicted relative to the personal computer 20, or portions thereof, may be stored in the remote memory storage devices. It will be appreciated that the network connections shown are exemplary and other means of establishing a communications link between the computers may be used.

The present invention can be utilized to derive translation relationships among words in substantially any environment or context. The machine translation architecture about to be described is but one environment or context.

Figure 2:
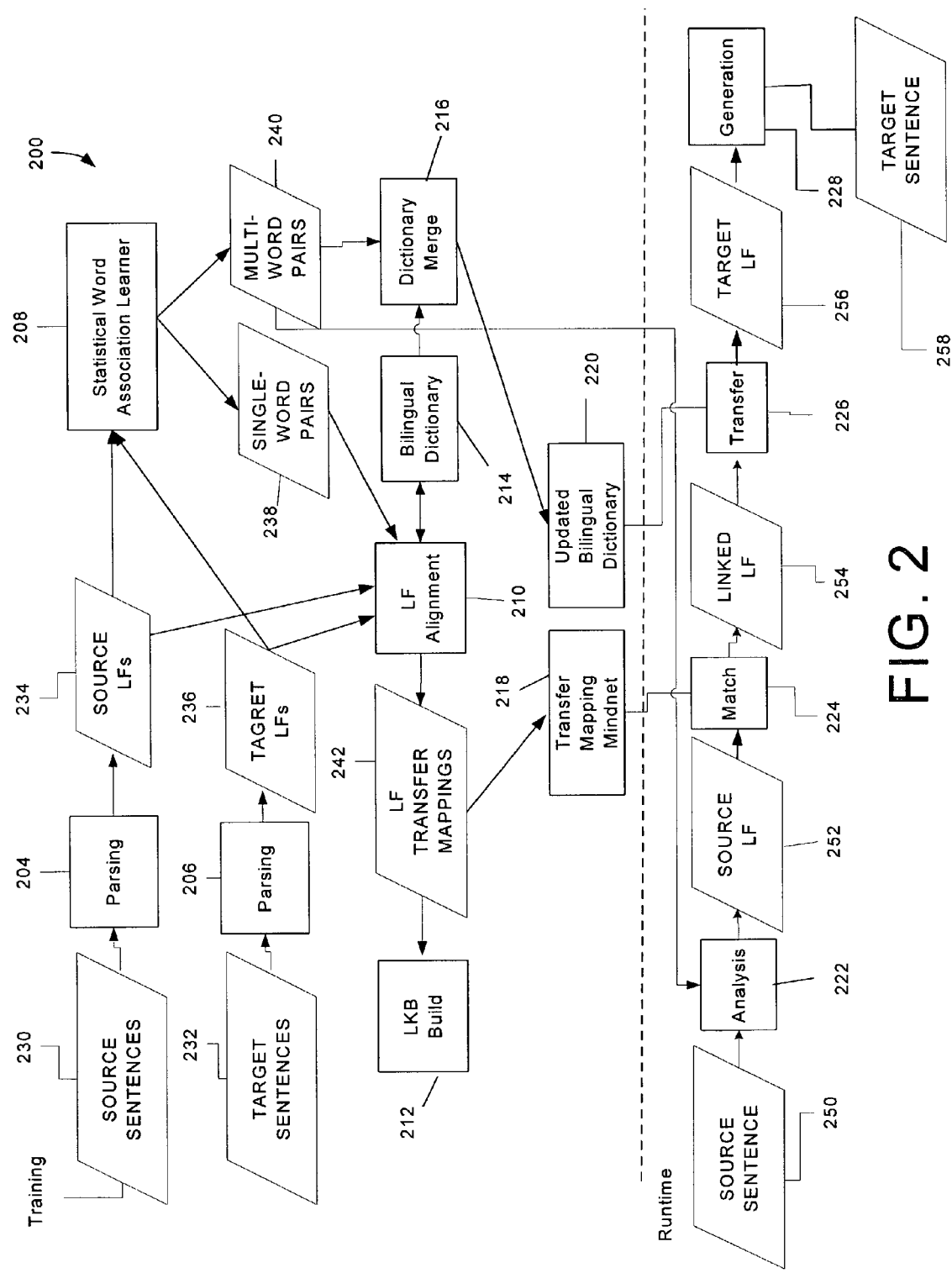
FIG. 2 is a more detailed block diagram of a general machine translation architecture in which the present invention can be used.

While logical forms are not required for the present invention, they are discussed in relation to the machine translation architecture shown in FIG. 2. Therefore, prior to discussing that architecture in greater detail, a brief discussion of a logical form will be helpful. A full and detailed discussion of logical forms and systems and methods for generating them can be found in U.S. Pat. No. 5,966,686 to Heidorn et al., issued Oct. 12, 1999 and entitled METHOD AND SYSTEM FOR COMPUTING SEMANTIC LOGICAL FORMS FROM SYNTAX TREES. Briefly, however, logical forms are generated by performing a morphological analysis on an input text to produce conventional phrase structure analyses augmented with grammatical relations. Syntactic analyses undergo further processing in order to derive logical forms which are graph structures that describe labeled dependencies among content words in the textual input. Logical forms normalize certain syntactical alternations, (e.g., active/passive) and resolve both intrasentential anaphora and long distance dependencies.

Specifically, a logical relation consists of two words joined by a directional relation type (e.g., Part, Time, Hypernym, LogicalSubject, Cause, Domain, Location, Manner, Material, Means, Modifier, Possessor, Purpose, Quasihypernym, Synonym, LogicalObject, and User). A logical form is a graph of connected logical relations representing a single textual input, such as a sentence. It minimally consists of one logical relation. The logical form portrays structural relationships (i.e., syntactic and semantic relationships), particularly argument and/or adjunct relation between important words in an input string.

In one illustrative embodiment of the machine translation architecture, the particular code that builds logical forms from syntactic analyses is shared across the various source and target languages that the machine translation system operates on. The shared architecture greatly simplifies the task of aligning logical form segments from different languages since superficially distinct constructions in two languages frequently collapse onto similar or identical logical form representations.

FIG. 2 is a block diagram of an architecture of a machine translation system 200 which defines one embodiment of an environment for the present invention. System 200 includes parsing components 204 and 206, statistical word association learning component 208 (where the bulk of the present invention resides, in this environment), logical form alignment component 210, lexical knowledge base building component 212, bilingual dictionary 214, dictionary merging component 216, transfer mapping database 218 and updated bilingual dictionary 220. During run time, the system utilizes analysis component 222, matching component 224, transfer component 226 and generation component 228.

In one illustrative embodiment, a bilingual corpus is used to train the system. The bilingual corpus includes aligned translated sentences (e.g., sentences in a source or target language, such as English, aligned with their translations in the other of the source or target language, such as Spanish or French, etc.). During training, sentences are fed from the aligned bilingual corpus into system 200 as source sentences 230 (the sentences to be translated), and as target sentences 232 (the translation of the source sentences). Parsing components 204 and 206 parse the sentences from the aligned bilingual corpus to produce source logical forms 234 and target logical forms 236. During parsing, the words in the sentences are converted to normalized word forms (lemmas). The term "lemma" as used herein refers to a stem or root word for a content word. For example, "sleep" is the lemma for the surface forms "sleep", "sleeping" and "slept." It should also be noted, however, that while one embodiment of the present invention is applied to content word lemmas, in another embodiment, the invention can be applied to surface forms instead, but performance may suffer somewhat. In any case, the lemmas are then fed into statistical word association learning component 208. Both single word and multi-word associations are iteratively hypothesized and scored by learning component 208 until a reliable set of each is obtained. Statistical word association learning component 208 outputs learned single word translation pairs 238 as well as multi-word pairs 240.

The multi-word pairs 240 are provided to a dictionary merge component 216 that is used to add additional entries into bilingual dictionary 214 to form updated bilingual dictionary 220. The new entries are representative of the multi-word pairs 240.

The single word pairs 238, along with source logical forms 234 and target logical forms 236 are provided to logical form alignment component 210. Component 210 first establishes tentative lexical correspondences between nodes in the source and target logical forms 230 and 236, respectively. This is done using translation pairs from a bilingual lexicon (or bilingual dictionary) 214 which are augmented with the single word translation pairs 238 from statistical word association learning component 208. After establishing possible correspondences, alignment component 210 aligns logical form nodes according to both lexical and structural characteristics and creates logical form transfer mappings 242.

Basically, alignment component 210 draws links between logical forms using the bilingual dictionary information 214 and single word pairs 238. The transfer mappings are filtered based on a frequency with which they are found in the source and target logical forms 234 and 236 and are provided to a lexical knowledge base building component 212.

In one example, if the transfer mapping is not seen at least twice in the training data, it is not used to build transfer mapping database 218, although any other desired frequency can be used as a filter as well. It should also be noted that other filtering techniques can be used as well, other than frequency of appearance. For example, transfer mappings can be filtered based upon whether they are formed from complete parses of the input sentences and based upon whether the logical forms used to create the transfer mappings are completely aligned.

Component 212 builds transfer mapping database 218 which contains transfer mappings that basically link logical forms, or parts thereof, in one language, to logical forms, or parts thereof, in the second language. With transfer mapping database 218 thus created, system 200 is now configured for runtime translations.

During run time, a source sentence 250, to be translated, is provided to analysis component 222. Analysis component 222 receives source sentence 250 and creates a source logical form 252 based upon the source sentence input.

An example may be helpful. In the present example, source sentence 250 is a Spanish sentence "Haga click en el boton de opcion" which is translated into English as "Click the option button" or, literally, "Make click in the button of option".

The source logical form 252 is provided to matching component 224. Matching component 224 attempts to match the source logical form 252 to logical forms in the transfer mapping database 218 in order to obtain a linked logical form 254. Multiple transfer mappings may match portions of source logical form 252. Matching component 224 searches for the best set of matching transfer mappings in database 218 that have matching lemmas, parts of speech, and other feature information. Larger (more specific) transfer mappings may illustratively be preferred to smaller (more general) transfer mappings. Among mappings of equal size, matching component 224 may illustratively prefer higher frequency mappings. Mappings may also match overlapping portions of the source logical form 252 provided that they do not conflict in any way.

After an optimal set of matching transfer mappings is found, matching component 224 creates links on nodes in the source logical form 252 to copies of the corresponding target logical form segments received by the transfer mappings, to generate linked logical form 254.

Transfer component 226 receives linked logical form 254 from matching component 224 and creates a target logical form 256 that will form the basis of the target translation. This is done by performing a top down traversal of the linked logical form 254 in which the target logical form segments pointed to by links on the source logical form 252 nodes are combined. When combining together logical form segments for possibly complex multi-word mappings, the sublinks set by matching component 224 between individual nodes are used to determine correct attachment points for modifiers, etc. Default attachment points are used if needed.

In cases where no applicable transfer mappings are found, the nodes in source logical form 252 and their relations are simply copied into the target logical form 256. Default single word translations may still be found in transfer mapping database 218 for these nodes and inserted in target logical form 256. However, if none are found, translations can illustratively be obtained from updated bilingual dictionary 220 which was used during alignment.

Generation component 228 is illustratively a rule-based, application-independent generation component that maps from target logical form 256 to the target string (or output target sentence) 258. Generation component 228 may illustratively have no information regarding the source language of the input logical forms, and works exclusively with information passed to it by transfer component 226. Generation component 228 also illustratively uses this information in conjunction with a monolingual (e.g., for the target language) dictionary to produce target sentence 258. One generic generation component 228 is thus sufficient for each language.

With the above context in mind, the present discussion now proceeds more specifically with respect to statistical word association learning component 208. It should also be again noted that, while the present context illustrates component 208 operating on logical forms and in a machine translation architecture, that need not necessarily be the case. Rather, component 208 can simply operate on aligned corpora which have been tokenized (or broken into individual words). Component 208 can also be used to perform other tasks, other than to operate in a machine translator. For example, component 208 can be used in forming a dictionary, or can simply be used to generate word association scores or relationships between words in different languages, and need not operate in the context of a machine translator. The above discussion is given by way of example only.

Figure 3:
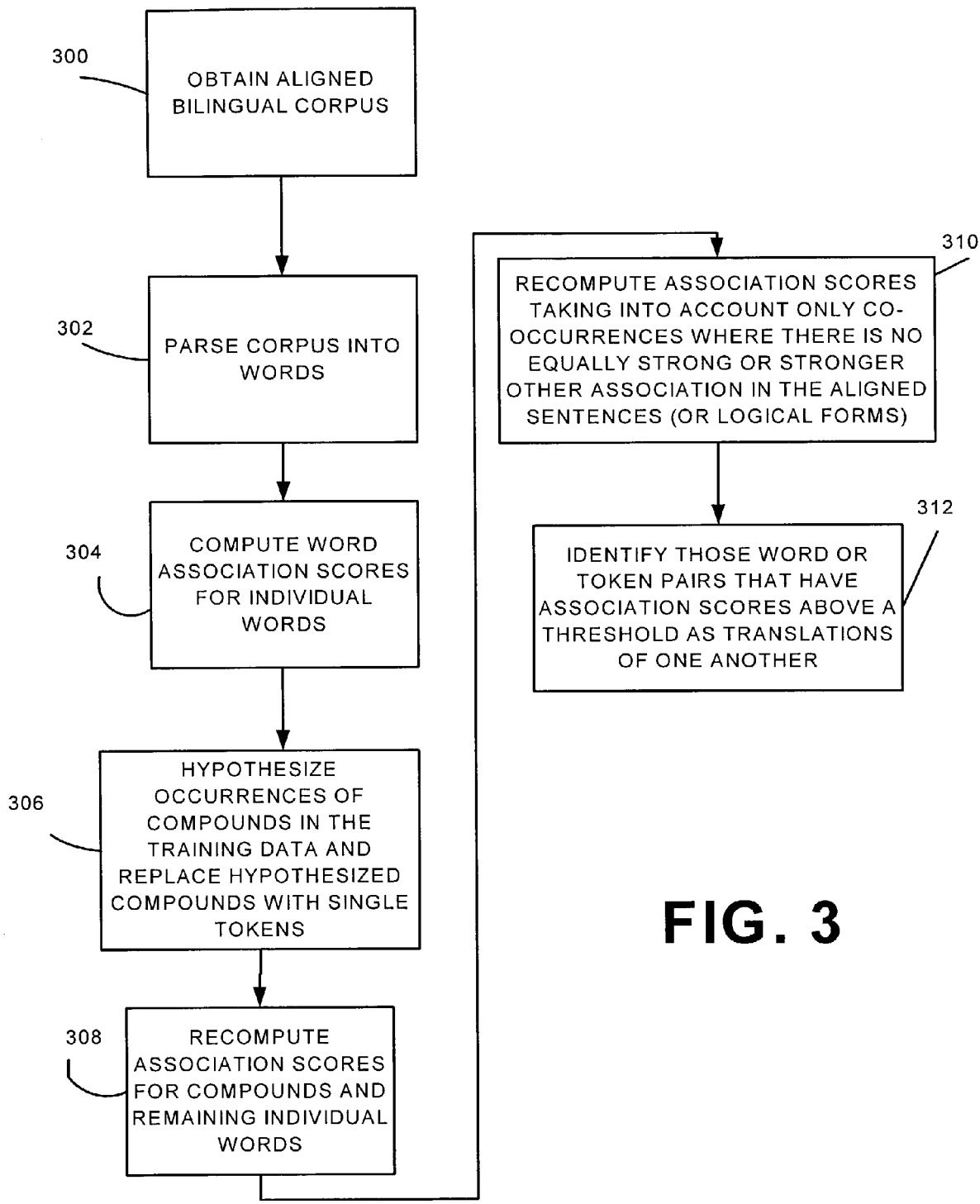
FIG. 3 is a flow diagram illustrating one embodiment of deriving translation relationships among words in an aligned bilingual corpus.

FIG. 3 is a flow diagram illustrating a method by which component 208 derives translation pairs (or translation relationships between pairs of words in different languages). First, component 208 obtains access to an aligned bilingual corpus. This is indicated by block 300. The corpus is parsed into its component words (e.g., lemmas as discussed above, but it could also be maintained in surface form). This is indicated by block 302. Of course, in the context illustrated above, the aligned corpus is parsed by parsing components 204 and 206 into source and target logical forms 234 and 236. However, the present invention is not confined to operating on textual inputs that are parsed into logical forms, but instead simply needs to have the aligned corpus parsed into its content words. In addition, the parser may also identify certain lexical compounds as if they are single units. If such multi-word expressions are placed in the lexicon, because they have a specific meaning or use, or because they are in one of a number of general categories such as proper names, names of places, time expressions, dates, measure expressions, etc., they are identified as multi-words.

Component 208 next computes the word association scores for individual word pairs in the aligned, parsed, bilingual corpus. This is indicated by block 304. While any word association metric can be used that provides a score indicative of a statistical word association between word pairs in the training corpus, the present invention uses the log-likelihood-ratio statistic discussed by Dunning in Dunning, *Accurate Methods for the Statistics of Surprise and Coincidence, Computational Linguistics,* 19(1) :61–74(1993). This statistic is used to compare the overall frequency of a word or lemma in language 1 ($WL_1$) in the training data to the frequency of a word or lemma in language 1 ($WL_1$) given a word or lemma in language 2 ($WL_2$) (i.e., the frequency with which $WL_1$ occurs in sentences of L1 that are aligned with sentences of L2 in which $WL_2$ occurs). Applying the log-likelihood-ratio static therefore provides a measure of the likelihood that an observed positive association between $WL_1$ and $WL_2$ is not accidental.

The list of word pairs for which association scores are computed can also be pruned. In other words, the process of computing the word association scores generates association scores for a large number of word (or lemma) pairs for a large training corpus. Therefore, in one illustrative embodiment, the set of word pairs is pruned to restrict further processing to those pairs having at least some chance of being considered as translation pairs. One illustrative heuristic sets this threshold to be the degree of association of a pair of words or lemmas that have one co-occurrence, plus one other occurrence each.

Next, component 208 hypothesizes the occurrence of compounds in the training data and replaces the hypothesized compounds with a single token. This is indicated by block 306. A generalized example maybe helpful.

Figure 4A:
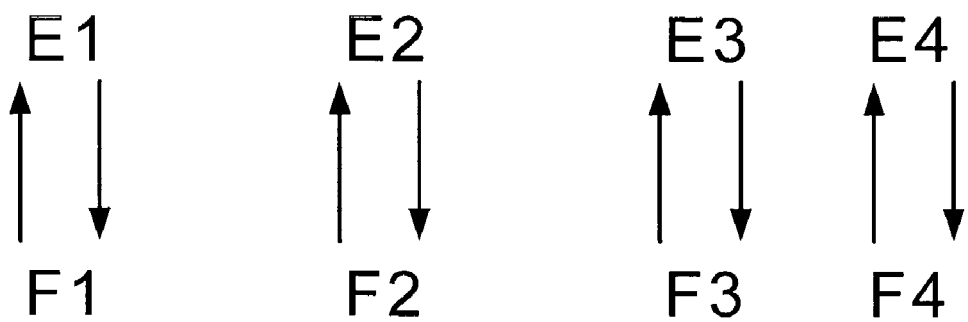
FIGS. 4A–5 illustrate different statistical word association relationships among words in two different languages.

FIG. 4A shows a sequence of words in aligned sentences in English and French. The words in the English sequence are represented by $E_x$ and the words in the French sequence are represented by $F_x$. The arrows pointing from the English sequence to the French sequence illustrate which of the French words the corresponding English word is most strongly associated with. Therefore, it can be seen that $E_1$, for example, is most strongly associated with $F_1$. The arrows pointing from the French sequence to the English sequence illustrate which of the English words the corresponding French word has a most strong association with, based on the word association scores. Therefore, in the example, it can also be seen that $F_1$ is most strongly associated with $E_1$. Since each of the English words is most strongly associated with a corresponding French word, and that French word is most strongly associated with the corresponding English word, there is said to be a simple 1-to-1 correspondence between the English sequence of words and the French sequence of words.

Figure 4B:
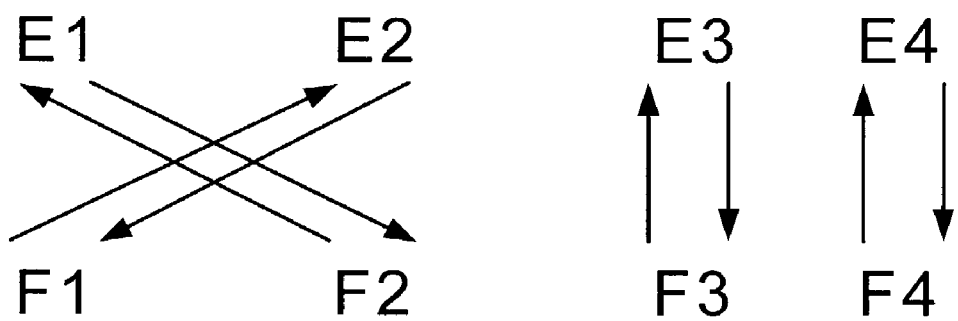

Similarly, FIG. 4B also shows a 1-to-1 correspondence between the sequences of words. FIG. 4B is somewhat different than FIG. 4A because the English word E1 is most strongly associated with the French word F2, and the English word E2 is most strongly associated with the French word F1. However, the French word F1 is also most strongly associated with the English word E2 and the French word F2 is most strongly associated with the English word E1. Therefore, there is still a 1-to-1 correspondence between the word sequences, but the order of the French words is slightly different than the order of the English words.

Figure 5:
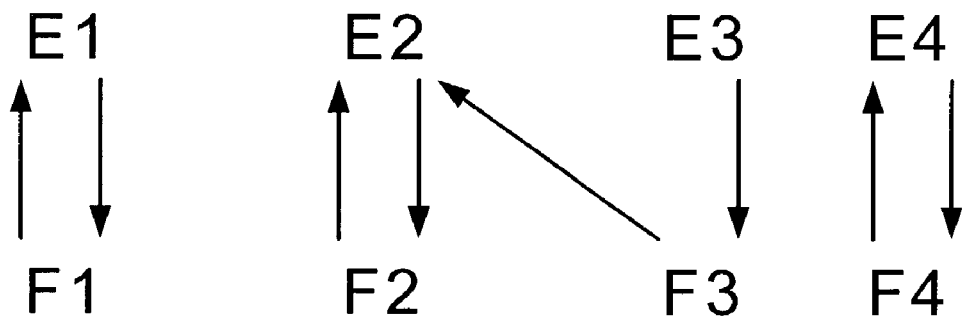

FIG. 5, however, illustrates a slightly different case. In FIG. 5, the English words E1 and E4 have a 1-to-1 association with the French words F1 and F4, respectively. However, though the English word E2 is most strongly associated with the French word F2 and the French word F2 is most strongly associated with the English word E2, the French word F3 is also most strongly associated with the English word E2. Therefore, the English words E2 and E3 and the French words F2 and F3 do not have a 1-to-1 correspondence. This lack of 1-to-1 correspondence is highly indicative of the need to hypothesize compounds to obtain correct translations. As is described in greater detail with respect to FIG. 6, the English words E2 and E3 and the French words F2 and F3 are hypothesized as compounds and are replaced by fused tokens (e.g., E2_E3 and F2_F3) in the original input text.

Component 208 next recomputes the association scores for the rewritten input text (i.e., the compounds and any remaining individual words). This is indicated by block 308 in FIG. 3. This is basically repeating the step indicated by block 304, with the text rewritten in terms of the hypothesized compounds.

Next, the association scores are again recomputed. However, this time, only co-occurrences are taken into account where there is no equally strong or stronger other association in the aligned sentences. This is indicated by block 310. In other words, assuming that all of the compounds needed for translation have been correctly identified and reformulated in the training data as a single item, the training data can be treated as if all translations are 1-to-1. Therefore, the final set of ranked translation pairs are chosen on the assumption that true translation pairs will always be mutually most strongly associated in a given aligned sentence pair. Thus, recomputation of the association scores indicated by block 310 is performed in just the same way as that indicated by block 308 except that words in the different languages ($WL_1$ and $WL_2$) are considered to have a joint occurrence only if $WL_1$ is uniquely most strongly associated with $WL_2$, and $WL_2$ is uniquely most strongly associated with $WL_1$, among the words (or lemmas or compound lemmas) present in a given aligned sentence pair. The associations computed in step 308 are used to make this decision. The final set of associations is then sorted in decreasing order according to the strength of association.

Finally, those pairs of words and/or compounds that have association scores above a threshold in the final list are identified as translations of one another. This is indicated by block 312. The threshold can be empirically chosen, or it can be chosen based on a linguistic analysis of the results provided in the final pair list, or it can be chosen using another desired technique.

Figures 6, 9:
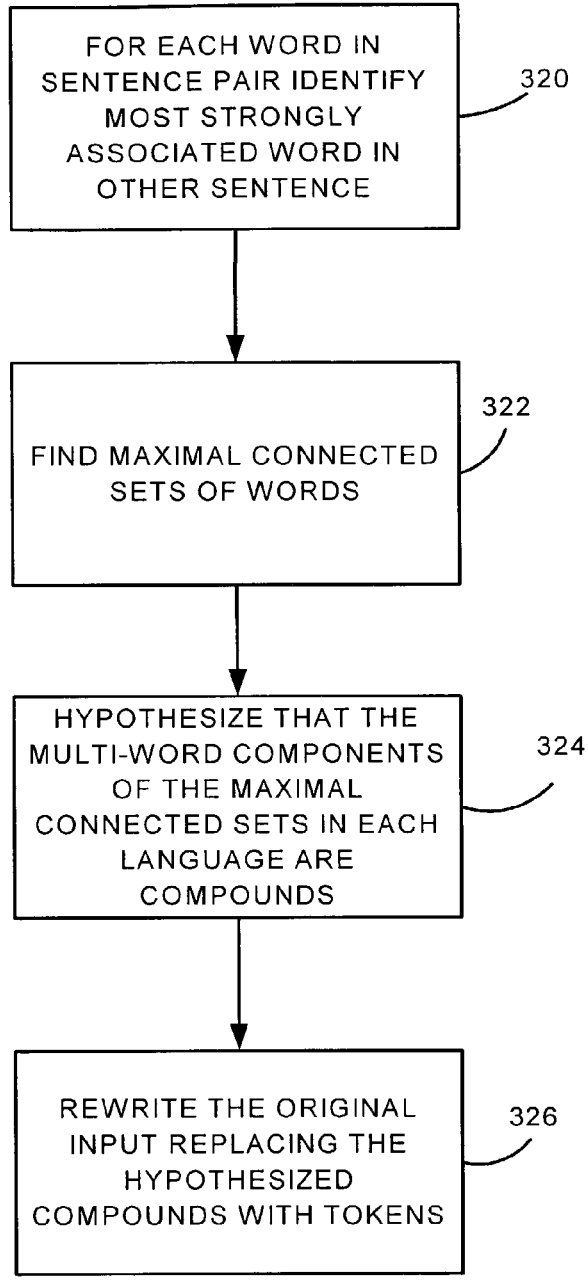
FIG. 6 is a flow diagram illustrating one embodiment of identifying hypothesized compounds.
FIG. 9 illustrates a rewritten input string using single tokens to represent hypothesized compounds.

FIG. 6 is a flow diagram which illustrates, in greater detail, how compounds are hypothesized as set out in block 306 in FIG. 3. It will be discussed with respect to the example shown in FIG. 5 where there is not a direct 1-to-1 correspondence between the original word sequences in the aligned sentences.

First, for each word in an aligned pair of sentences, component 208 identifies the most strongly associated word in the other sentence of the pair. In other words, component 208 basically constructs the graph or a representation of the graph illustrated in FIG. 5. This is indicated by block 320 in FIG. 6.

Figure 7:
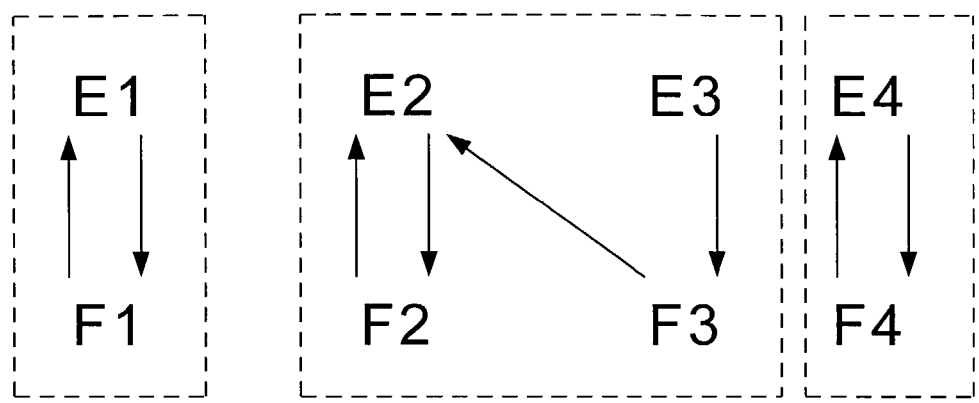
FIG. 7 illustrates the identification of maximal, connected sets of words in pairs of aligned sentences in the training data.

Component 208 next finds the maximal, connected sets of words within the graphs. This is indicated by block 322. Basically, component 208 examines the graph created to identify areas where items in the graph can be grouped (or circled) and no arrows extend outside that area. This is represented by the dashed circles shown in FIG. 7. Each of the groups of words encompassed in one of the dashed circles is identified as a maximal, connected set. All items in the maximal, connected sets are thus most strongly associated with another item in the maximal, connected set, and none are more strongly associated with items outside of the maximal, connected set.

Figure 8:
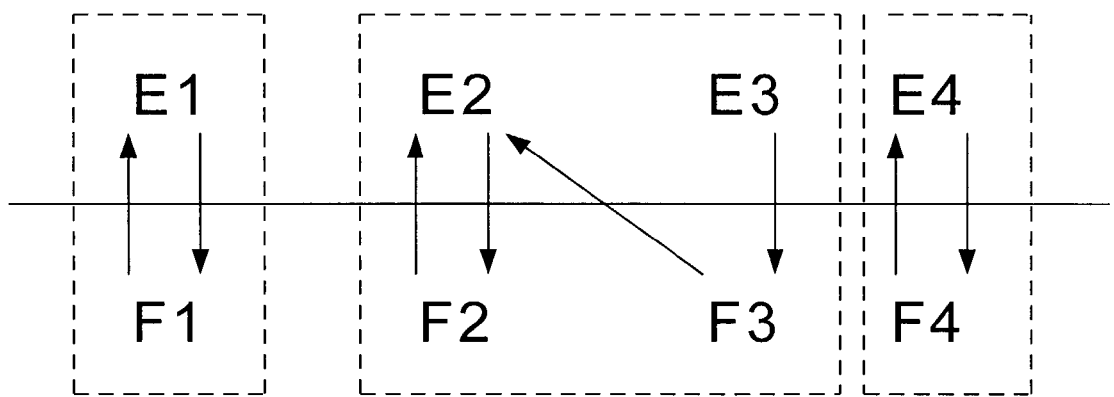
FIG. 8 illustrates hypothesizing compounds from the maximal, connected sets identified in FIG. 7.

Component 208 then divides the maximal, connected sets into the two different languages and hypothesizes that the multi-word components of the maximal, connected sets in each language are compounds. This is indicated by block 324. For example, FIG. 8 shows that the maximal, connected sets of FIG. 7 have been divided by a horizontal line which divides the English word sequence from the French word sequence. Component 208 thus hypothesizes that multi-word components of the maximal, connected sets in each language (components E2 and E3 in the English language and components F2 and F3 in the French language) are compounds. This identifies compounds, for example, such as "ouvir_session" and "log_on".

Component 208 then rewrites the original input file replacing the hypothesized compounds (E2 and E3, F2 and F3) with fused tokens. This is indicated by block 326. FIG. 9 illustrates this step in greater detail. In FIG. 9, the term E2_E3 represents the English token corresponding to items E2 and E3 in the original text and the item F2_F3 corresponds to a token which represents the words F2 and F3 in the original French input text. Having the tokens thus hypothesized and rewritten, processing continues with respect to block 308 in FIG. 3 where the word association scores for the compounds and the remaining individual words are computed.

The present invention can also be used to address another problem that arises in parsing raw input text. In many types of text, particularly certain types of technical texts, phrases are not used in their usual way, but are instead used as the name of something in that particular domain. For example, the sentence "Click to remove the View As Web Page check mark." includes the term "View As Web Page" which has the syntactic form of a nonfinite verb phrase. However, in the sentence, it is used as if it is a proper name. If the parser does not recognize this special use of the phrase, it is virtually impossible to parse the sentence correctly.

In the English language, expressions of this type can be handled in a straight-forward manner, primarily because capitalization conventions in English make these types of phrases easy to recognize. The tokenizer used to tokenize the input text prior to parsing hypothesizes that sequences of capitalized words, such as "View As Web Page" should be treated as lexicalized multi-word expressions. This subclass of multi-words is referred to herein as "captoids".

Identifying translations of these captoids, however, is very difficult. This is primarily because the capitalization conventions in other languages (such as French or Spanish, for example) only capitalize the first word of such an expression. Therefore, while it is relatively straight-forward in the English language to determine where a captoid begins and ends, it is very difficult in other languages.

Figure 10:
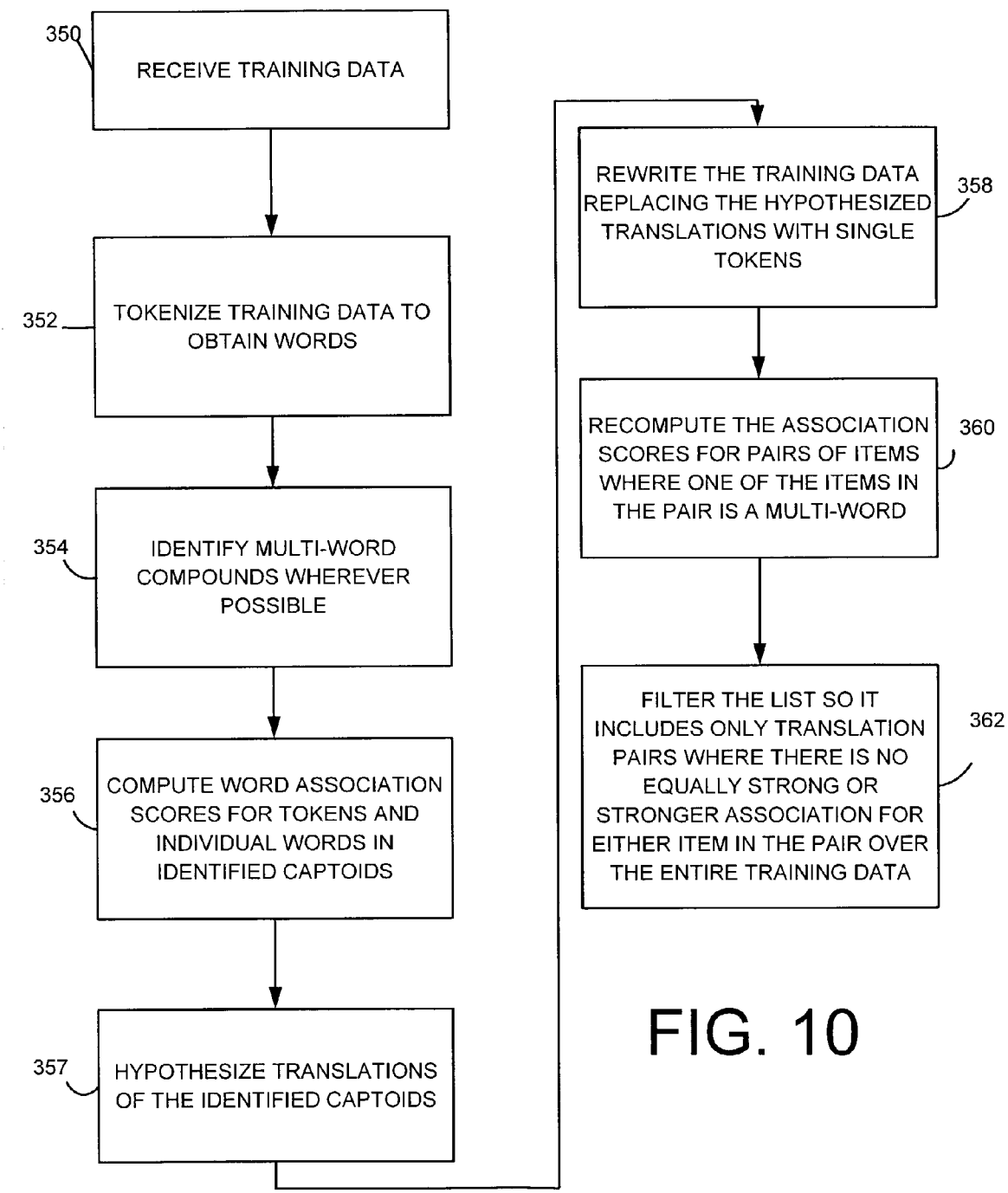
FIG. 10 is a flow diagram illustrating the identification of translations of captoids.

The present invention can be used to identify translations of captoids, and add them to the translation lexicon used by the parser or used at various other places in the machine translation system such that captoids can be accurately translated. The present invention takes advantage of the fact that, in the English language, such captoids can be identified in a straight-forward manner and also takes advantage of the features of the present invention which can be used to identify compounds. FIG. 10 is a flow diagram that better illustrates the method of identifying the translation of captoids in accordance with one embodiment of the present invention.

First, the training data from the aligned, bilingual corpus is received. This is indicated by block 350. Next, the training data is tokenized to obtain the various different words in the training data. Any commercial available tokenizer can be used, so long as it breaks the training data into words. This is indicated by block 352. Next, the multi-word compounds, including captoids, are identified. This is indicated by block 354. In one embodiment, in the English language, captoids are identified by looking for word sequences where the first word in the sequence begins with a capital letter and later words in the sequence do not begin with a lower case letter. This allows for the appearance in captoids of things, other than letters, such as "3.0". Once the captoids are identified, the words in the word sequence that make up each captoid are grouped as a single token per captoid. This is done by placing underscores between the words in each word sequence that forms a captoid.

Component 208 then computes word association scores or statistics for the tokens output by the tokenizer 352, and for the individual words in the identified captoids. The individual words in each captoid can be identified in a straight-forward manner, by simply separating the elements of the captoid at the underscore marks. Computing the word associations is indicated by block 356 in FIG. 10.

Component 208 then hypothesizes corresponding compounds in the target language that correspond to the captoids identified in the source language by the tokenizer. This is indicated by block 357. Hypothesizing the compounds that correspond to the identified captoids will be discussed in greater detail with respect to FIG. 11.

Component 208 then rewrites the training data replacing the hypothesized compounds with single tokens. This is indicated by block 358 in FIG. 10.

The word association scores are then recomputed for the pairs of items in the training data where either the item in the source language (e.g., English) or the item in the target language (e.g., French) is a multi-word beginning with a capital letter. This is indicated by block 360. This is because the process illustrated in FIG. 10 is for identifying translations of captoids. Therefore, in step 360, the word association scores need only be recomputed for items where at least one of the items in the translation pair is a captoid (i.e., a multi-word beginning with a capital letter). The resulting pairs are ordered according to the strength of their association score.

Component 208 then filters the list so that it includes only translation pairs where there is no equally strong, or stronger, association for either item in the translation pair, in the entire training data. This is indicated by block 362. It can be seen that the restrictions applied in this step are more stringent than those applied, for example, in block 310 of FIG. 3. This is done because, while a single word may have more than one translation in different contexts, the sort of complex multi-word represented by a captoid can normally be expected to receive the same translation in substantially all contexts. Therefore, only translations involving captoids that are mutually uniquely most strongly associated across the entire corpus are accepted.

It should also be noted that, in order to focus on cases of greatest interest, and to increase accuracy, other filters can also be placed on generation of translation pairs. For example, the translation pairs can be restricted to those including only a target item (such as a French item where French is the target language) that is one of the multi-words constructed in this process. Similarly, translation pairs can be restricted to include only those where the English item is a multi-word, all of whose constituent words are capitalized. Also, since the French language is generally considered to be a more verbose language than English, the translation pairs can be restricted to include only those where the French item contains at least as many words as the English item. Of course, these restrictions may be slightly tailored to other languages.

Again, of course, as with the previous embodiment, a threshold can be determined and only those translation pairs having a word association score which meets the threshold are considered translations of one another, and the rest can be discarded.

Once the translations of the captoids have been identified, those translations are illustratively fed back to the translation lexicons used by parsing components 204 and 206. They can also be fed forward as multi-word pairs 240 to be added to bilingual dictionary 214 by dictionary merge component 216, in order to obtain updated bilingual dictionary 220.

Figure 11:
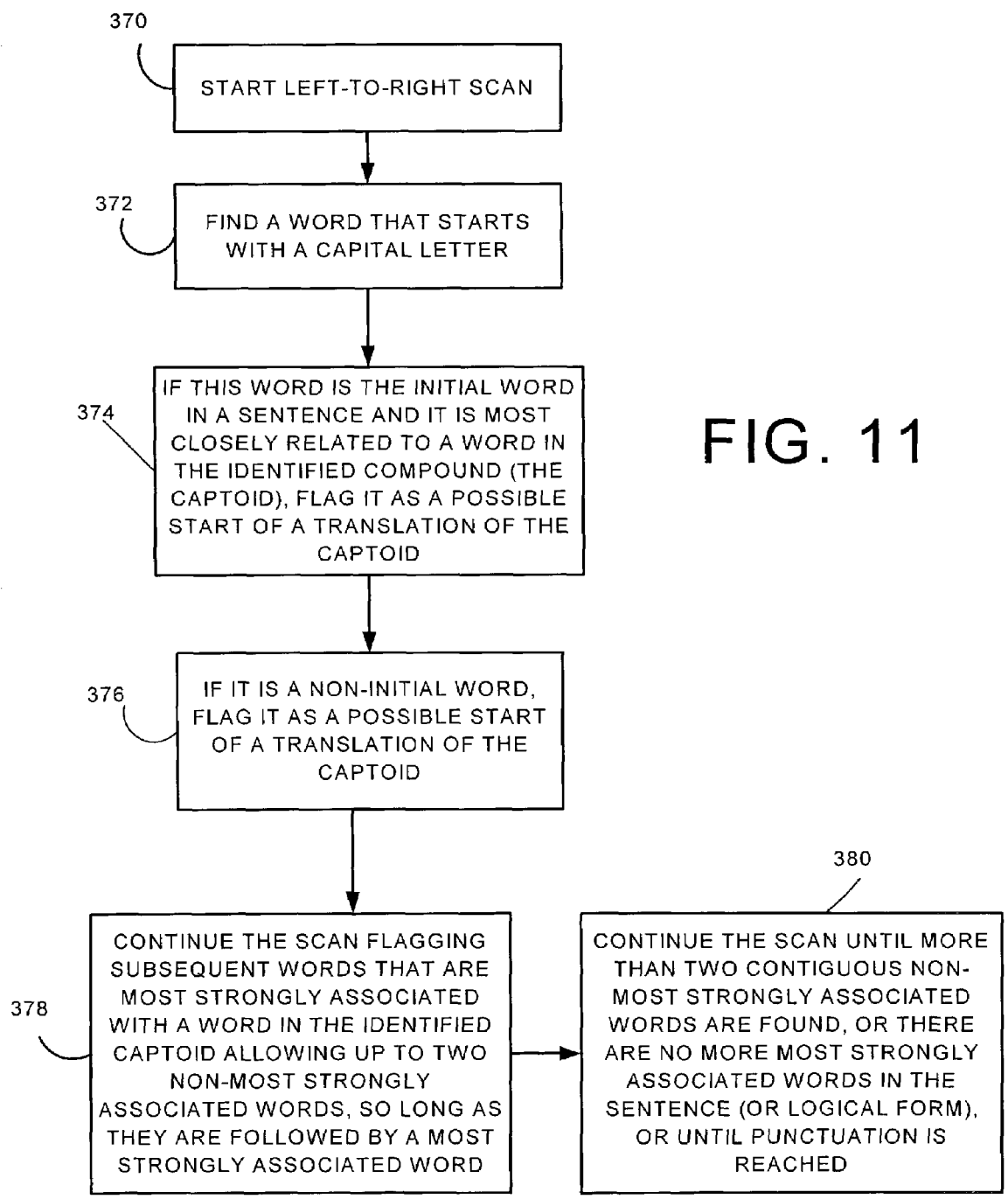
FIG. 11 is a flow diagram illustrating how compounds corresponding to identified captoids are hypothesized.

FIG. 11 is a more detailed flow diagram illustrating how compounds corresponding to identified captoids are hypothesized as set out in block 357 of FIG. 10. The process illustrated in FIG. 11 assumes that captoids in the source language (e.g., English) have already been identified. Therefore, it can be seen that the process illustrated in FIG. 11 is unidirectional, in that it is only trying to identify translations of captoids in the target language, where the captoids have already been identified in the source language.

It should also be noted that this process of hypothesizing compounds occurs after word association scores have been computed for the tokens representing the input text (the individual words in the identified captoids, as well as the captoids taken as a single unit). In one illustrative embodiment, if any of the association scores between a target word (e.g., a French word) and the constituent word of a source multi-word (e.g., the constituent words in the English multi-word) are higher than the association score between the word in the target language and the entire multi-word in the source language, then the highest such score is used to represent the degree of association between the word in the target language (e.g., the French word) and the multi-word in the source language (e.g., the English multi-word).

In addition, only sets of target words (e.g., French words) that are most strongly associated in a particular aligned sentence pair with a source multi-word that starts with a capitalized word are reserved for consideration as the basis of compounds.

At this point, component 208 begins to scan the sentence in the target language of the aligned pair under consideration, from left to right. This is indicated by block 370. The scanning is conducted to find a word that starts with a capital letter. This is indicated by block 372. If such a word is located, and it is the initial word in a sentence, then it is determined whether it is most closely related to a word in the identified compound (e.g., in the English multi-word). If so, it is flagged as the possible start of a corresponding compound, which is a translation of the identified captoid. This is indicated by block 374 in FIG. 11.

If the word located in block 372 is a non-initial word (i.e., it is not the first word of the sentence), then it is flagged as the possible start of the translation of the captoid (e.g., the English multi-word). This is indicated by block 376.

Once this first word is located, component 208 continues to scan the target text from left to right, flagging subsequent words that are most strongly related to words in the identified captoid. In doing so, component 208 allows up to two contiguous words which are not most highly related to words in the identified captoid, so long as they are followed by a word that is most highly related to a word in the identified captoid. This is indicated by block 378. This allows the system to account for function words (such as French function words) that may not have high associations with anything in the source multi-word. As long as these conditions are met, each subsequent word in the target sentence is added to the target multi-word (the translation of the identified captoid in the source text).

Component 208 continues this scan until it finds more than two contiguous words in the target text that are not most highly related to words in the identified captoid, or until there are no more words in the target text that are most highly related to a word in the identified captoid, or until a punctuation symbol is encountered. This is indicated by block 380.

Having thus hypothesized the compounds as possible translations of captoids, processing again continues in FIG. 10 at block 358 where the training data is rewritten replacing the hypothesized compounds with single tokens, where the association scores are recomputed and the translation pairs are filtered. This is indicated by blocks 358, 360 and 362, and is discussed in greater detail above.

It can thus be seen that the present invention provides a simplified statistical approach to deriving translation relationships between word pairs and compounds. The present invention offers advantages over prior systems in that the embodiments of the present technique are far less complex to implement and require far less time and computational resources to run. The present invention also enhances the derivation of translation relationships for compounds and captoids.

Although the present invention has been described with reference to particular embodiments, workers skilled in the art will recognize that changes may be made in form and detail without departing from the spirit and scope of the invention.

What is claimed is:

1. A method of calculating translation relationships among words, comprising:
   calculating word association scores for word pairs based on co-occurrences of words in each of a plurality of sets of aligned, bilingual units in a corpus;
   identifying hypothesized compounds in the units based on the word association scores;
   re-calculating the word association scores, given the hypothesized compounds; and
   obtaining translation relationships based on the re-calculated word association scores, wherein obtaining translation relationships comprises:
      repeating the step of re-calculating word association scores considering co-occurrences of pairs, including pairs of words, pairs of compounds, and compound/word pairs, in a pair of aligned units only if the pairs are uniquely most strongly associated with one another among all words in the pair of aligned units, to obtain ultimate word association scores; and
      ranking pairs based on the ultimate word association scores.

2. The method of claim 1 wherein obtaining translation relationships further comprises:
   selecting pairs as translations of one another if the corresponding ultimate word association scores are above a threshold level.

3. A method of calculating translation relationships among words, comprising:
   calculating word association scores for word pairs based on co-occurrences of words in each of a plurality of sets of aligned, bilingual units in a corpus;
   identifying hypothesized compounds in the units based on the word association scores;
   re-calculating the word association scores, given the hypothesized compounds; and
   obtaining translation relationships based on the re-calculated word association scores;
   wherein calculating word association scores comprises:
      calculating the word association scores based on a surface form of the words in each of the aligned, bilingual units.

4. A method of training a machine translation system, comprising:
   obtaining a corpus of aligned, bilingual multi-word units;
   calculating word association scores for word pairs in the corpus based on co-occurrence of words in the aligned units;
   identifying hypothesized compounds based on an absence of one-to-one correspondence between words in the aligned units;
   re-calculating the word association scores, given the hypothesized compounds;
   training the machine translation system based on the word association scores and the hypothesized compounds;
   repeating the step of re-calculating word association scores considering co-occurrences of pairs, including word pairs, compound pairs and word/compound pairs, in a pair of aligned units only if the pairs are uniquely most strongly associated with one another among all words in the pair of aligned units, to obtain ultimate word association scores; and
   ranking pairs based on ultimate word association scores.

5. The method of claim 4 and further comprising:
   selecting pairs as translations of one another if the corresponding ultimate word association scores are above a threshold level.

6. The method of claim 5 wherein training the machine translation system based on the word association scores and the hypothesized compounds, comprises:
   generating transfer mappings mapping a unit in one of the languages to a unit in the other of the languages based on the selected translations.

7. A method of training a machine translation system, comprising:
   obtaining a corpus of aligned, bilingual multi-word units;
   calculating word association scores for word pairs in the corpus based on co-occurrence of words in the aligned units;
   identifying hypothesized compounds based on an absence of one-to-one correspondence between words in the aligned units; and
   training the machine translation system based on the word association scores and the hypothesized compounds;
   wherein the words are surface forms of the words.

* * * * *